UNITED STATES PATENT OFFICE.

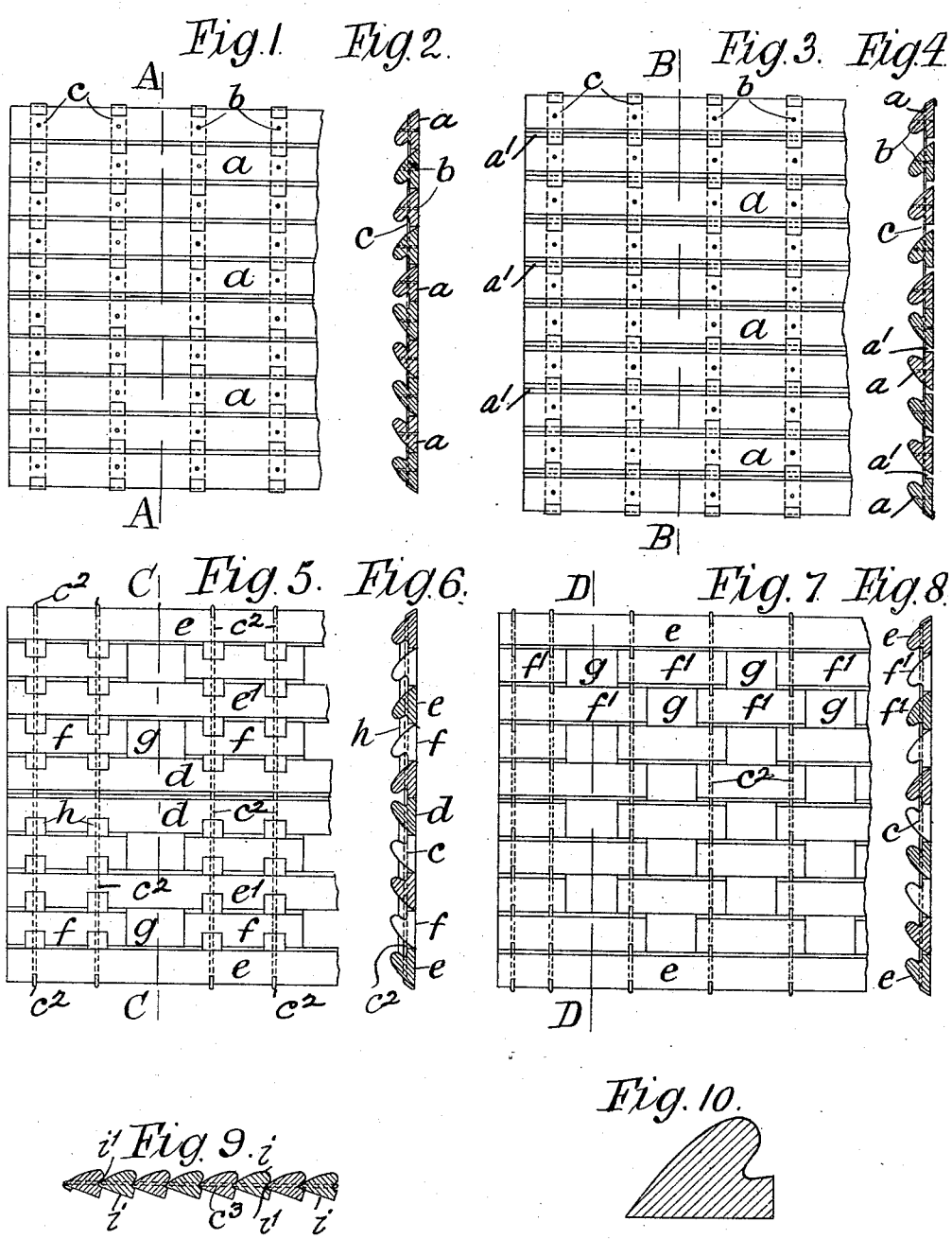

GEORGE CUMMINGS, OF GOSFORTH, ENGLAND.

DOOR MAT, TREAD, AND THE LIKE.

1,074,586.  Specification of Letters Patent.  Patented Sept. 30, 1913.

Application filed December 13, 1912. Serial No. 736,547.

*To all whom it may concern:*

Be it known that I, GEORGE CUMMINGS, a subject of the King of England, residing at Gosforth, in the county of Northumberland, in England, have invented certain new and useful Improvements in Door Mats, Treads, and the like, of which the following is a specification.

This invention relates to improvements in door mats, treads, and the like.

The mat or tread may be made of new material of right angled triangular section, but preferably the object in making the mat or tread is to utilize the beaded or thickened edges of the worn out covers of motor car tires and the like. The beads when cut off the cover are approximately of right angled triangular section and at present are of little or no value.

The mats may be made of rectangular, square, or other form. New material of the section mentioned, or the beads as aforesaid are cut off the tire covers, the cut surface forming part of one side of the right angle of the section, but although the cut is made as close as the rounded point of the bead will permit, a groove is left between the cut surface and the rounded point.

The beads are cut into strips of the required length for the size of mat, and a number of said strips are placed alongside each other, and laced or tied together by round or flat wires which pass from one edge of the mat to the other through each strip. Half the beads or strips lie in one direction and the other half in the other direction to counteract any tendency for said beads or strips to resume the curved form, and the underside of the mat is usualy flat, the cut surfaces being vertical and the point of one bead directed toward or bearing against the cut surface of the adjoining bead. A mat made as above will be of substantially close structure, and in order to make it open to permit dust etc., to pass through, every alternate strip is made in one piece, while the others are formed of short lengths with spaces between, or the outer strips may be in one piece, and all or most of the others made of such short lengths with spaces between, or each strip may be kept slightly apart by small distance pieces strung on the wires which hold the strips together.

When used as a stair tread or for purposes requiring a close mat, the strips are laced closely together with the point or apex of one strip fitting into the aforesaid recess or groove of the adjoining strip. This gives a serrated surface to both the top and underside of the mat.

Embodiments of the invention are illustrated in the accompanying drawings, in which—

Figure 1 is a partial plan view of a mat with the strips placed close together and interconnected by means of flat metal ties. Fig. 2 is a section of Fig. 1 on the line A—A thereof. Fig. 3 is a partial plan of a mat with the strips slightly separated and interconnected by means of flat metal ties. Fig. 4 is a section of Fig. 3 on the line B—B. Fig. 5 is a partial plan view of a mat with the outer and alternate strips formed of one piece and the other strips formed of spaced short lengths with ties formed of wire of circular section. Fig. 6 is a section of Fig. 5 on the line C—C. Fig. 7 is a partial plan view of a mat with the outer strips formed in one piece and the remainder of short lengths with spaces between and ties of circular section. Fig. 8 is a section of Fig. 7 on the line D—D. Fig. 9 is a section of a portion of a mat showing the arrangement of strips with the point of one strip engaging a groove in an adjacent strip, and Fig. 10 is a section on an enlarged scale of an ordinary piece of bead when detached from a tire.

In the construction shown in Figs. 1 and 2, the strips are laid alongside each other with the cut surfaces thereof in vertical planes. In these figures $a$ $a$ designate the strips of the mat each formed of a single piece and placed close together, one of such strips forming each outer edge of the mat. Extending through each strip is a plurality of flat metal ties $c$ connected to the strips by means of pins $b$.

The construction shown in Figs. 3 and 4 is very similar to that of Figs. 1 and 2, the only difference being that the strips are slightly separated by narrow spaces $a^1$ except the two center strips.

In the construction shown in Figs. 5 and 6, $d$ designate the central strips, $e$ the outer strips and $e^1$ certain intermediate strips, all formed in one piece. Between said strips are short lengths of material $f$ $f$ so disposed as to leave spaces $g$ $g$ between them within the circumference of the mat, the strips $d$, $e$ and $e^1$ and the short lengths $f$ being all interconnected by means of metal ties $c^2$ of circular cross section traversing said parts. In this construction distance pieces $h$ are shown interposed between the strips and short lengths and traversed by the ties $c^2$. These pieces may be used in any of the constructions shown.

In Figs. 7 and 8 $e$ designate outer strips, the space between which is occupied by short lengths of material $f^1$ $f^1$ with spaces $g$ between, said strips and short lengths being interconnected by means of metal ties $c^2$ of circular cross section.

In all the constructions illustrated it will be seen that the strips on one side of the longitudinal center line of the mat lie in one direction, while those on the other side lie in the opposite direction, for the purpose above referred to.

In the form illustrated in Fig. 9 the point of one strip $i$ is shown fitting into the groove or recess $i^1$ of the adjoining strip and all the strips are held together by a wire tie $c^3$, this construction giving a serrated surface on both surfaces of the mat or tread.

What I claim as my invention and desire to secure by Letters Patent of the United States is:—

1. A mat or tread comprising a plurality of pieces of material resilient throughout and of substantially single right-angle triangular sections the inclined surfaces of the pieces on one-half of the longitudinal center of the mat lying in the opposite direction to the similar surfaces on the other half, and tie members engaging each of said pieces to connect the whole together.

2. A mat or tread comprising a plurality of strips of material resilient throughout and of substantially right-angled triangular cross-section, the inclined surfaces of the strips on one half of the longitudinal center of the mat lying in an opposite direction to the similar surfaces on the other half, short lengths of material also of substantially right-angled triangular cross-section disposed in juxtaposition to said strips, and being spaced apart to provide open spaces between said lengths of material, and tie members traversing said strips and short lengths of material and being secured thereto to connect the same together.

In witness whereof I have signed this specification in the presence of two witnesses.

GEORGE CUMMINGS.

Witnesses:
T. J. WATSON,
C. S. GARDNER.

Copies of this patent may be obtained for five cents each, by addressing the "Commissioner of Patents, Washington, D. C."